United States Patent
Son et al.

(10) Patent No.: US 8,571,164 B2
(45) Date of Patent: Oct. 29, 2013

(54) CLAMPING JIG AND SYSTEM FOR MEASURING SPACER GRIDS FOR NUCLEAR FUEL ASSEMBLY

(75) Inventors: Se Ik Son, Daejon (KR); Hyung Sup Kim, Daejon (KR); Seok Bong Kim, Daejon (KR); Hae Gyoon Jung, Daejon (KR); Yong Tae Kim, Daejon (KR); Gab Jin Han, Daejon (KR)

(73) Assignee: Kepco Nuclear Fuel Co., Ltd., Daejeon (KR)

( * ) Notice: Subject to any disclaimer, the term of this patent is extended or adjusted under 35 U.S.C. 154(b) by 436 days.

(21) Appl. No.: 12/948,501

(22) Filed: Nov. 17, 2010

(65) Prior Publication Data

US 2012/0063559 A1    Mar. 15, 2012

(30) Foreign Application Priority Data

Sep. 9, 2010    (KR) .................. 10-2010-0088447

(51) Int. Cl.
*G21C 17/00*    (2006.01)
*G21C 3/30*    (2006.01)

(52) U.S. Cl.
USPC .......................... 376/249; 376/245; 376/463

(58) Field of Classification Search
USPC .................. 376/245, 249, 259, 260, 463
See application file for complete search history.

(56) References Cited

U.S. PATENT DOCUMENTS 5,398,264 A * 3/1995 Anderson et al. ............. 376/260
5,406,599 A * 4/1995 Johnson et al. ............... 376/260

FOREIGN PATENT DOCUMENTS

EP    0493259 A1 *    7/1992

* cited by examiner

*Primary Examiner* — Bernarr Gregory
(74) *Attorney, Agent, or Firm* — Rabin & Berdo, P.C.

(57) ABSTRACT

In a clamping jig and system for inspecting spacer grids for a nuclear fuel assembly, the jig firmly and precisely clamps a variety of grids on a measurement stage moving at high speed so that, among constituent parts of the nuclear fuel assembly, the spacer grids can be inspected using a non-contact measurer. The clamping jig includes a frame having a plurality of holding recesses into which the corresponding spacer grids are inserted, supporting means mounted in each holding recess of the frame to allow each spacer grid to be adjusted from below so it can be maintained in a horizontal state, clamping means installed around each holding recess to clamp two adjacent sides of each spacer grid to a corner of the respective holding recess, and resilient means installed on the sides opposite the clamping means and resiliently supporting the other two sides of each spacer grid.

9 Claims, 4 Drawing Sheets

CLAMPING JIG AND SYSTEM FOR MEASURING SPACER GRIDS FOR NUCLEAR FUEL ASSEMBLY

CROSS-REFERENCE TO RELATED APPLICATIONS

The present application claims priority under 35 USC §119 patent application Ser. No. 10-2010-0088447, filed in the republic of Korea on Sep. 9, 2010.

BACKGROUND OF THE INVENTION

1. Field of the Invention

The present invention relates, in general, to a clamping jig and system for inspecting spacer grids for a nuclear fuel assembly which is capable of firmly and precisely clamping a variety of spacer grids on a measurement stage moving at high speed so that, among constituent parts of the nuclear fuel assembly, the spacer grids can be inspected using a non-contact measurer.

2. Description of the Related Art

In general, spacer grids used to support and fix fuel rods are interwoven grid straps having springs and dimples in rows and columns, and are welded at the intersections of the grid straps.

In spacer grids that are currently in use, inner and outer grid straps are arranged in rows and columns to form cells which accept fuel rods, and the arranged grid straps are fused by laser welding or brazing. Each cell of the spacer grid includes springs and dimples formed on its faces to support a fuel rod. Positions and shapes of the springs and dimples have a great influence on the performance of nuclear fuel rod assembly.

Currently, at least 20 types of spacer grids are produced, depending on the type of nuclear reactor core, the method of fusion of the spacer grid, and the function of the spacer grid. In the process of producing the spacer grid, the dimension and shape of the spring and dimple of the spacer grid can vary as a result of external impact and/or high temperatures generated by grid strap fusion. To determine if undesirable variations have occurred, the spacer grid must be inspected.

To inspect the spacer grid, the verticality of the dimple and a distance between the dimple and the spring are measured using a non-contact, three-dimensional inspection system. Here, a jig capable of firmly clamping the spacer grid is required. Existing jigs, however, can clamp only a specific type or size of spacer grid. Thus, only one spacer grid can be mounted and measured at a time, and therefore, it is impossible to avoid costly extended inspection time and reduced inspection efficiency.

SUMMARY OF THE INVENTION

Accordingly, the present invention has been made to overcome the above problems, and embodiments of the present invention provide a clamping jig and a system for inspecting spacer grids for a nuclear fuel assembly capable of firmly and precisely clamping a variety of spacer grids on a measurement stage moving at high speed, so that among constituent parts of the nuclear fuel assembly, the spacer grids can be inspected using a non-contact, three-dimensional measurer.

According to one embodiment, the present invention provides a clamping jig for securing spacer grids for a nuclear fuel assembly, the clamping jig comprising: a frame having a plurality of holding recesses into which the corresponding spacer grids are inserted; supporting means mounted in each holding recess of the frame to allow each spacer grid to be adjusted from below so as to be maintained in a horizontal state; clamping means installed around each holding recess to clamp two adjacent sides of each spacer grid to one corner of each holding recess; and resilient means installed at sides of the holding recess opposite to the clamping means and resiliently supporting the other two sides of each spacer grid.

According to another embodiment, the present invention provides a system for inspecting spacer grids for a nuclear fuel assembly, the system comprising: a main body having a stage; a clamping jig placed on the stage; and an inspection unit located above the clamping jig for measuring the spacer grids clamped by the clamping jig. The clamping jig comprises: a frame placed above the stage and having a plurality of holding recesses into which corresponding spacer grids are inserted; supporting means mounted in each holding recess of the frame and including a backplate and at least one support pin for supporting each spacer grid from underneath; clamping means installed around each holding recess to clamp two adjacent sides of each spacer grid to each holding recess; and resilient means installed opposite the clamping means and resiliently securing the other two sides of each spacer grid.

Here, the supporting means can comprise: a transparent backplate installed in each holding recess of the frame; and at least one support pin installed on the transparent backplate and supporting a lower surface of each spacer grid. Each support pin can include a screw and double nuts to support each spacer grid on the same level, to maintain the horizontal state of each spacer grid.

The clamping means can be fixed by two guide pins installed at one corner of each holding recess of the frame, the location of which can be changed by using at least two pairs of holes corresponding to the guide pins to accept various types of spacer grids.

The resilient means can include: a block body installed on the frame adjacent a holding recess; a pressing piece installed on the block body for pressing against the spacer grid in the corresponding holding recess; and at least one spring adjacent to the pressing piece and applying resilient force to the pressing piece.

The pressing piece can include a slanted guide face for guiding each spacer grid into the corresponding holding recess.

According to the present invention, the variety of spacer grids can be held by the clamping jig of this embodiment, so that a plurality of spacer grids can be inspected at a time. As a result, it is possible to improve work efficiency.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Figure 1:
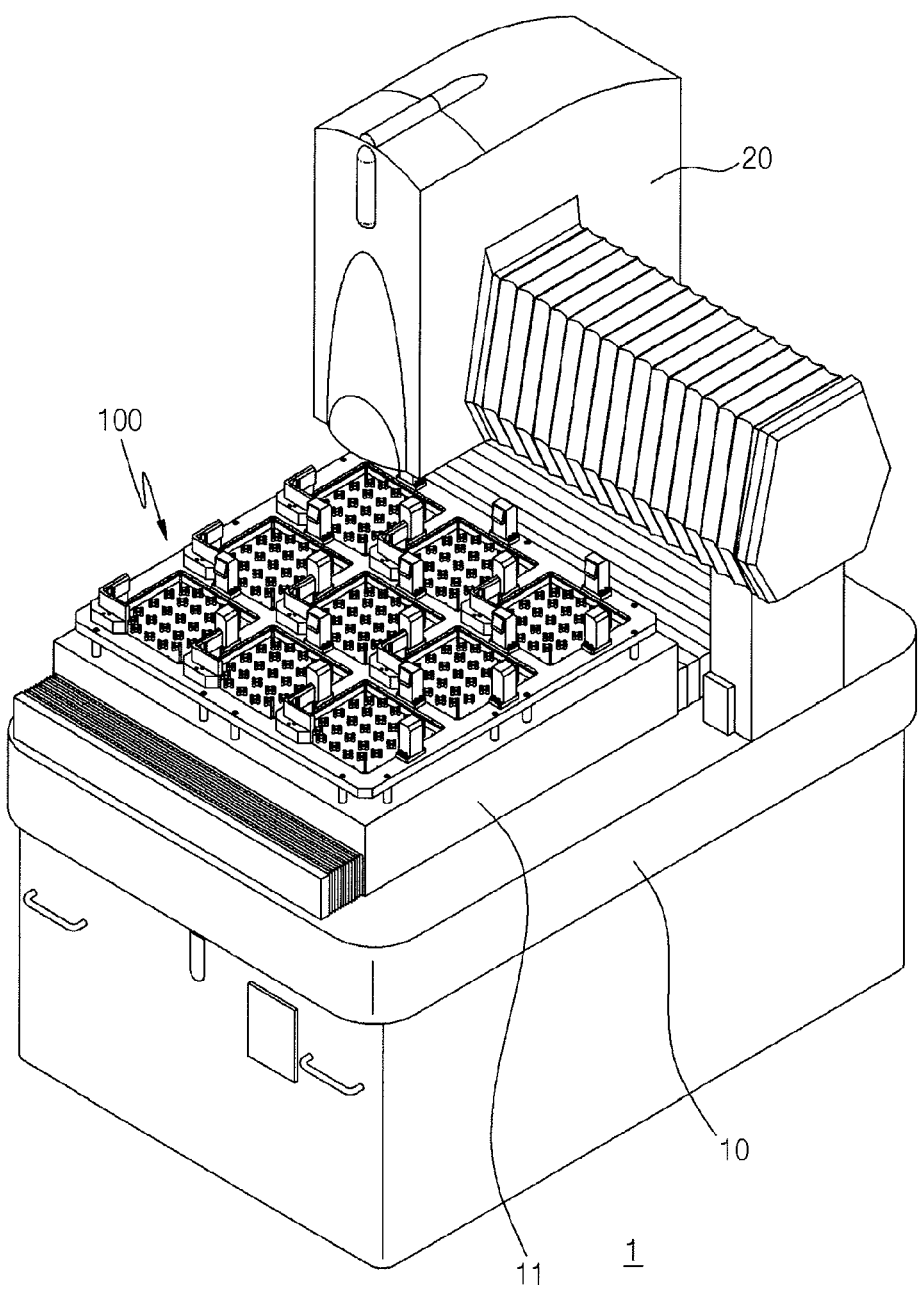
FIG. 1 is a perspective view illustrating an entire structure of a system for inspecting spacer grids for a nuclear fuel assembly (hereinafter, referred to as "inspecting system") having a clamping jig for holding spacer grids to be measured according to an exemplary embodiment of the present invention.

Exemplary embodiments of the invention will now be described in greater detail with reference to the accompanying drawings.

Further, the terms and words used in the present specification and claims have to be interpreted according to the meanings and concepts of the terms that correspond to the technical spirit of the present invention.

Therefore, embodiments described herein and configurations illustrated in the drawings are merely examples of embodiments of the present invention, and should not be construed as limiting the scope of the invention.

Hereinafter, a system for inspecting spacer grids for a nuclear fuel assembly according to an exemplary embodiment of the present invention will be described with reference to the accompanying drawings.

Figure 2:
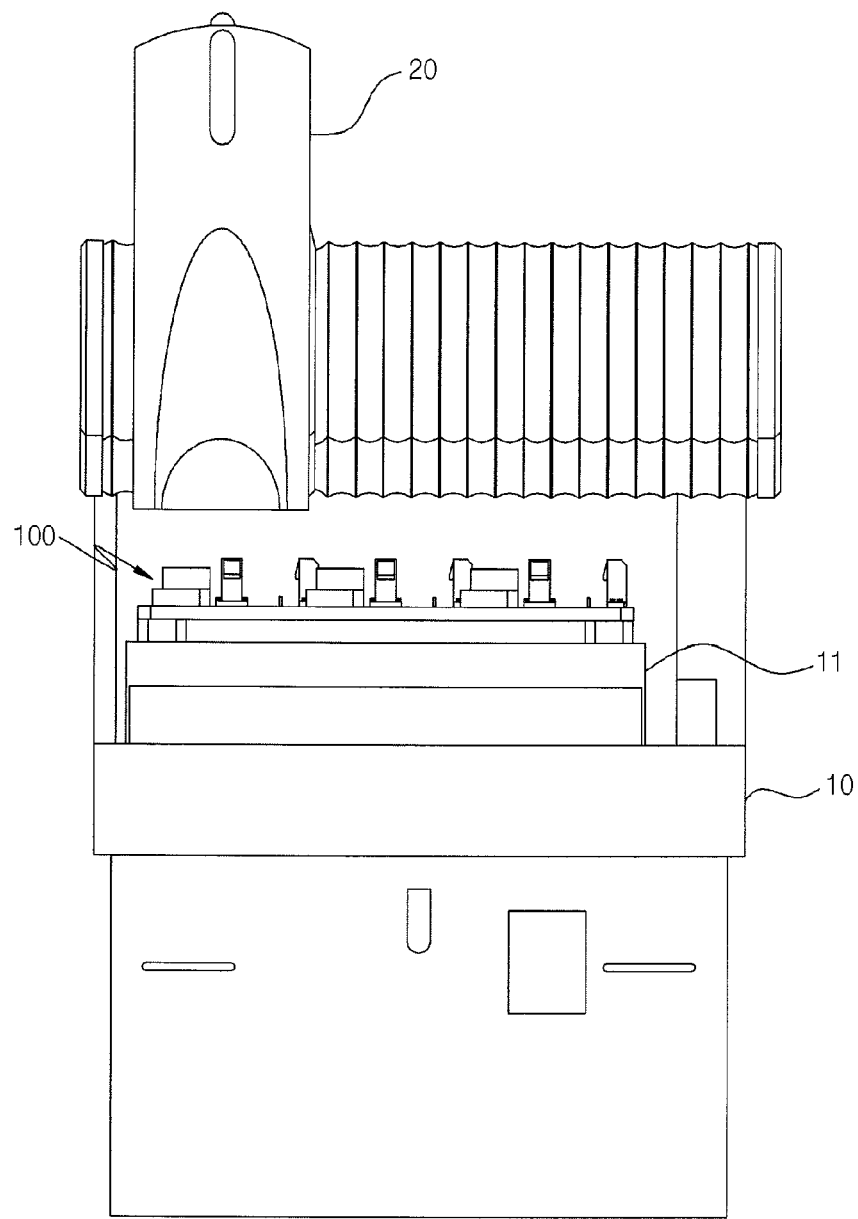
FIG. 2 is a front view illustrating the inspecting system of FIG. 1.
Figure 3:
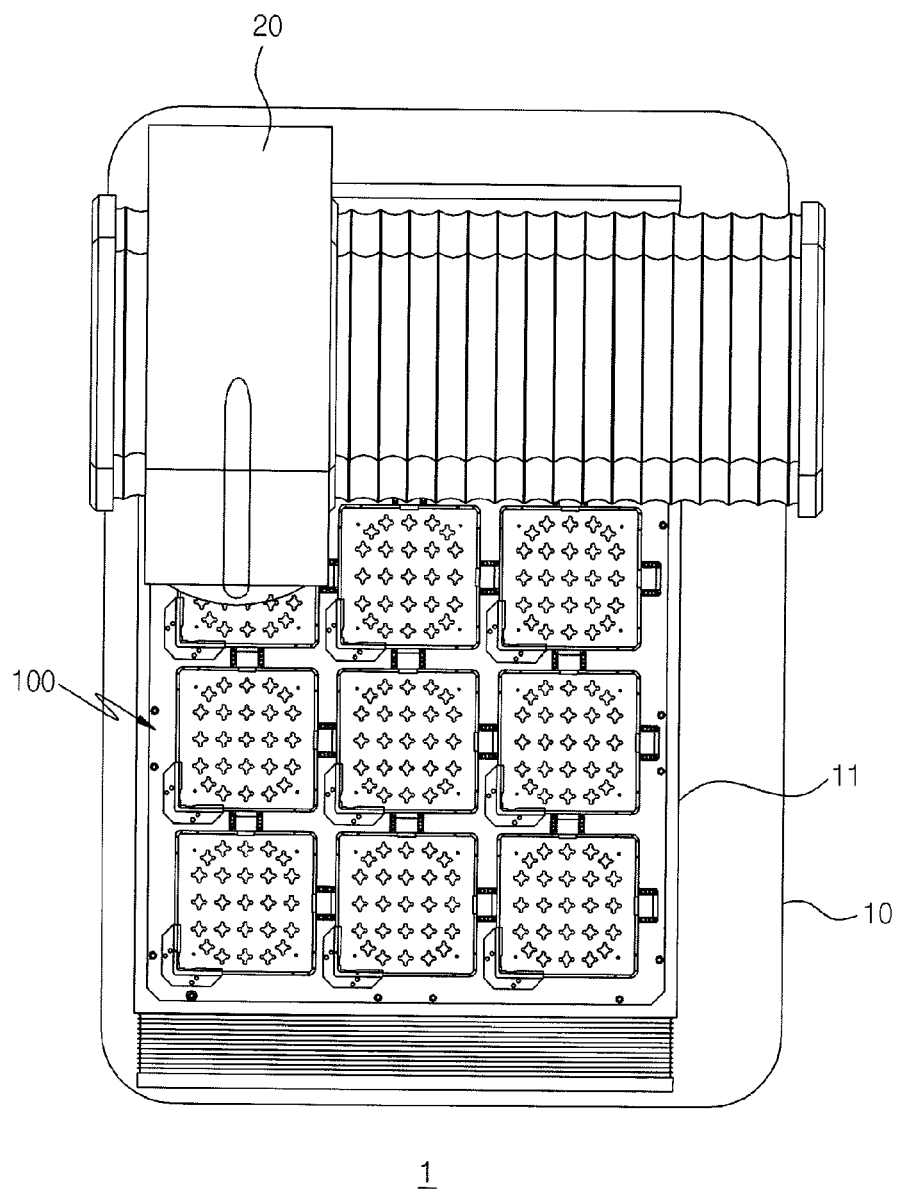
FIG. 3 is a top plan view illustrating the inspecting system of FIG. 1.

As illustrated in FIGS. 1 through 3, the system 1 for inspecting spacer grids for a nuclear fuel assembly according to an exemplary embodiment of the present invention includes a main body 10 having a stage 11, and an inspecting unit 20 installed on main body 10. A clamping jig 100 according to an embodiment of the present invention is installed on the inspecting system 1.

Figure 4:
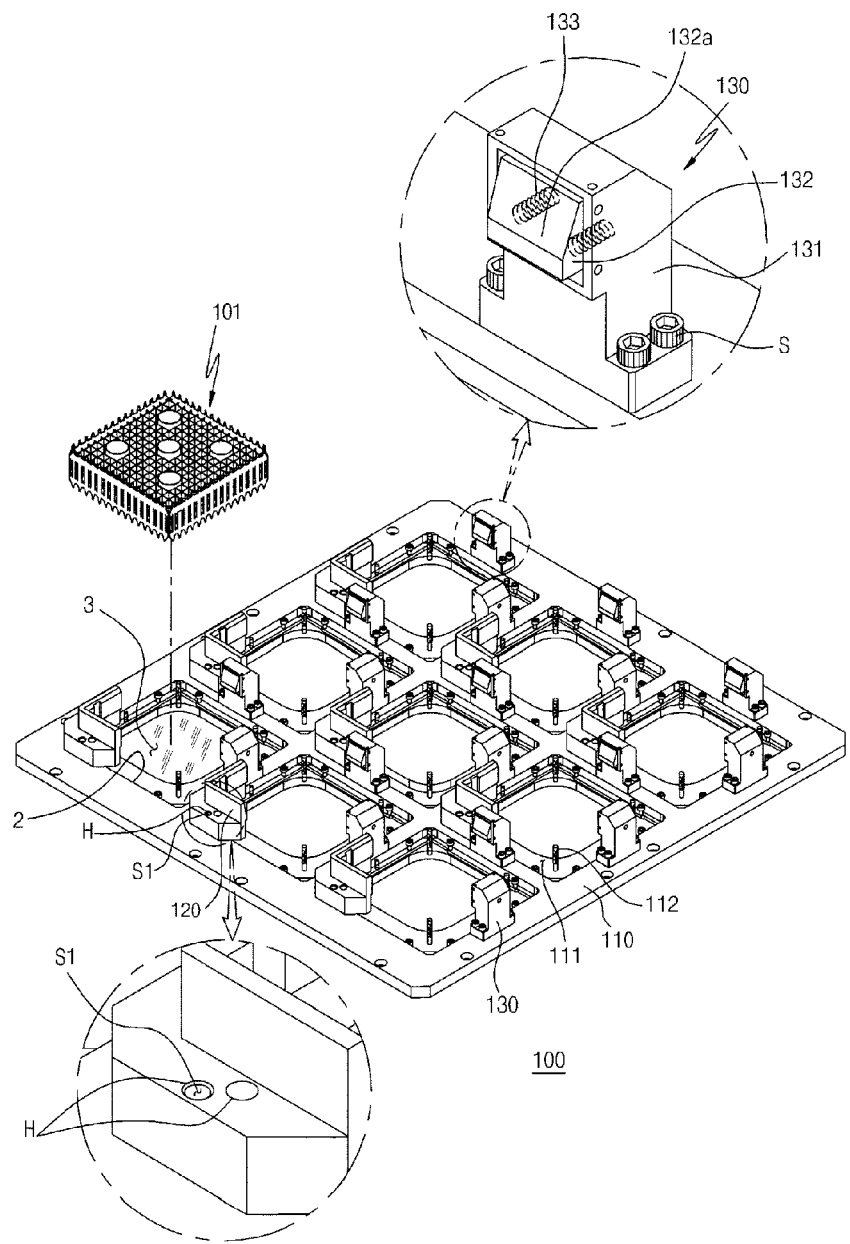
FIG. 4 is a perspective view illustrating the clamping jig for holding spacer grids for a nuclear fuel assembly to be measured according to an exemplary embodiment of the present invention.

First, as illustrated in FIG. 4, the clamping jig 100 according to an embodiment of the present invention includes a quadrilateral frame 110, in an upper part of which holding recesses 2 are formed, supporting means (hereinafter referred to as a "backplate") 111 mounted in each holding recess of the frame, and clamping means (hereinafter referred to as a "clamping block") 120 and resilient means (hereinafter referred to as a "resilient block") 130, both of which are installed on the frame 110 to support each spacer grid.

The frame 110 has the shape of a flat plate made of a metal material of a predetermined thickness to maintain strength against deformation, and is provided with screw holes along its circumference to allow frame 110 to be installed on a worktable (not shown). The frame 110 is provided with a plurality of holding recesses 2, such that the inspecting system 1 can accept a plurality of spacer grids 101 all at one time. Each holding recess 2 has a quadrilateral shape to correspond to the shape of a typical spacer grid. In this embodiment, a total of nine holding recesses 2 having a 3×3 array are shown in the frame 110.

According to this embodiment, the frame is designed to firmly secure the nine spacer grids, and is made of an anodized aluminum alloy in order to minimize its weight. However, the present invention is not limited to this configuration.

The backplates 111 are installed in the respective holding recesses 2 formed in the frame 110 to support the respective spacer grids in an upward direction. In detail, the backplates 111 are made of a transparent material, e.g. acryl, to allow transmission of the backlight of a non-contact, three-dimensional measurer, and are fixed in the respective holding recesses 2 formed in the frame 110 by fixing screws. Backplates 111 also are each provided with a quadrilateral through-hole 3 in the middle, in order to avoid interfering with a spacer grid sleeve (not shown) protruding from the spacer grid at a specific position. Further, each backplate 111 is provided with at least one support in 112 to support the grid straps so as not to disturb the measurement of springs (not shown) and dimples (not shown) of each spacer grid 101.

Each support pin 112 has a screw and dual-nut (double-nut) structure to adjust the level of the spacer grid 101 and to maintain a horizontal state of the spacer grid 101. The at least one support pin 112 is of a predetermined size so as not to interfere with the backlight at a measuring position of the spacer grids 101.

The non-contact three-dimensional measurer is a high-tech coordinate calculation system using software to calculate distance, angle, width, etc. of a geometric shape detected from measuring a target captured by imaging technology using a charge coupled device (CCD) camera and precise CNC position control technology. Therefore, it is essential to firmly and stably fix the target on the inspection system 1 for high speed and precise measurement. Thus, to fix the spacer grid 101 (i.e., the measured target), the clamping jig 100 must stably maintain a horizontal state of the spacer grid 101 along the x and y coordinate axis positions of the inspection system 1, i.e., along transverse and longitudinal positions on the measurement stage, and also along coordinate positions on the z axis of the inspection system 1.

Each of the support pins 112 has a screw and double nuts that are adjustable so that they can support the spacer grid level. The upper nut of the double nuts which is in contact with the spacer grid is heat-treated so as to have improved strength against wear, and the middle part of its threaded part has a hole, because a welded intersection of the spacer grid has a protrusion.

Each clamping block 120 forms an approximate "L" shape to clamp two sides adjacent to one corner of the spacer grid 101, and is installed by two guide pins S1 at one corner of each holding recess 2 of the frame. Each clamping block 120 is provided with at least two pairs of holes H into which the guide pins S1 are inserted so as to clamp at least two spacer grids 101 having different sizes.

According to one embodiment, the clamping block 120 is formed of polyacetal (PA), to prevent damage to the spacer grid 101. However, the present invention is not limited to this material. Each clamping block 120 is constructed to cover a contour dimension difference of a spacer grid 101 within about 10 mm by at least two pairs of holes H corresponding to the guide pins S1 installed on the frame 10, and thus minimizes the time required to adjust the jig by making the clamping block 120 easy to attach and detach.

The resilient blocks 130 are installed on two sides subtending each clamping block 120 on each holding recess 2, and support two sides of the spacer grid 101 other than the two sides clamped by each clamping block 120. Each resilient block 130 includes a block body 131 installed on the frame 110 by fixing screws S, and a pressing piece 132 installed on an upper part of the block body 131 opposite the spacer grid 101 and resiliently pressing against spacer grid 101. Springs 133 installed in the block body 131 apply resilient force to the pressing piece 132. The pressing piece 132 is provided with a slanted guide face 132a for guiding the spacer grid 101 into the holding recess 2.

Here, each resilient block 130 can cover a contour dimension difference of the spacer grid 101 within 5 mm without needing an additional device because it presses against and clamps the spacer grid 101 into the holding recess 2 using the resilient force of the springs 133.

The spacer grid 101 functions to support and fix fuel or control rods using grid straps having springs and dimples in rows and columns in an interleaved fashion and fusing the intersections of the grid straps by welding or brazing.

For this nuclear fuel assembly, about 20 types of spacer grids are used depending on the type of reactor core of an atomic power plant, the method of fusion, and the function of the spacer grid, and are different in contour size, cell structure, cell interval, etc. depending on the type. To clamp the spacer grid on the measurer, a clamping jig capable of holding the spacer grid is required.

The inspection system 1 including the main body 10 and the inspection unit 20 can be a non-contact three-dimensional measurer which detects an image of the target in a non-contact fashion using a CCD camera having high resolution. Here, it is essential to secure proper illumination for measurement using such an image camera. To this end, the inspection system 1 includes camera-sided illumination to illuminate the measured target from the top, and a backlight to illuminate the measured target from the bottom. The bottom of the clamping jig 100 at the measuring position of the spacer grid 101 must not interfere with the backlight.

The non-contact three-dimensional measurer is a coordinate measurer moved by a CNC positioning control system which processes the captured image (measured target) to automatically detect coordinate values of boundary points, freely converts the detected results into preset various geometric shapes, i.e. points, lines, circles, planes, etc. using software, and outputs the converted results or automatically calculates correlation between these shapes, i.e., widths, distances, angles, etc., finally required by a user.

According to the present invention, to measure shapes and positions of the springs and dimples located in each cell of the spacer grid 101, the spacer grid 101 is gripped and held against the backplate 111 when it is positioned so that one corner comes into contact with the clamping block 120, and then the opposite corner is lowered in a downward direction against the pressing pieces 132 of the resilient block 130, and is pressed into the respective holding recess 2.

Here, the spacer grid 101 is pressed toward the clamping block 120 by the resilient force of the pressing pieces 132 installed in the two resilient blocks 130, so that it can be stably clamped. Accordingly, although the shape and size of the spacer grid 101 are not constant, a variety of spacer grids can be held by the clamping jig 100 of this embodiment, so that a plurality of spacer grids can be inspected at one time. As a result, it is possible to improve work efficiency.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A clamping jig for inspecting spacer grids for a nuclear fuel assembly, the clamping jig comprising:
   a frame having a plurality of holding recesses into which the corresponding spacer grids are inserted;
   a support mounted in each of the plurality of holding recesses of the frame, and configured to allow the level of each spacer grid to be adjusted and to be maintained in a horizontal state;
   a clamp installed around each of the plurality of holding recesses to clamp each spacer grid; and
   a resilient device installed on the sides opposite the clamp and resiliently supporting each spacer grid.

2. The clamping jig as in claim 1, wherein the support includes:
   a backplate installed in each of the plurality of holding recesses of the frame; and
   at least one support pin installed on the backplate and configured to support a lower surface of each spacer grid, each of the at least one support pin including a screw and double nuts.

3. The clamping jig as in claim 2, wherein the backplate of the support is made of a transparent material.

4. The clamping jig as in claim 3, wherein the transparent material is an acryl.

5. The clamping jig as in claim 1, wherein the clamp comprises two guide pins and at least two pairs of holes corresponding to the two guide pins.

6. The clamping jig as in claim 1, wherein the resilient device includes:
   a block body installed on the frame;
   a pressing piece installed on the block body and configured to press each spacer grid; and
   at least one spring applying resilient force to the pressing piece.

7. The clamping jig as in claim 6, wherein the pressing piece includes a slanted guide face configured to guide each spacer grid into corresponding each of the plurality of holding recesses.

8. A system for inspecting spacer grids for a nuclear fuel assembly, the system comprising:
   a main body having a stage;
   a clamping jig placed on the stage; and
   an inspection unit located above the clamping jig and configured to inspect the spacer grids clamped by the clamping jig,
   wherein the clamping jig comprises:
   a frame having a plurality of holding recesses into which the corresponding spacer grids are inserted and placed above the stage;
   a support mounted in each of the plurality of holding recesses of the frame, and including a backplate and at least one support pin configured to support each spacer grid from below;
   a clamp installed around each of the plurality of holding recesses to clamp two adjacent sides of each spacer grid; and
   a resilient device installed on the sides opposite the clamp and resiliently supporting the other two sides of each spacer grid.

9. A clamping jig for inspecting spacer grids for a nuclear fuel assembly, the clamping jig comprising:
   a frame having a plurality of holding recesses into which the corresponding spacer grids are inserted;
   a support mounted in each of the plurality of holding recesses of the frame, and configured to allow the level of each spacer grid to be adjusted and to be maintained in a horizontal state;
   a clamp installed around each of the plurality of holding recesses to clamp each spacer grid; and
   a resilient device installed on the sides opposite the clamp and resiliently supporting each spacer grid,
   wherein the support includes:
   a transparent backplate installed in each of the plurality of holding recesses of the frame; and
   four support pins installed on the transparent backplate and supporting a lower surface of each spacer grid, each of the four support pins including a screw and double nuts,
   wherein the clamp comprises two guide pins and two pairs of holes corresponding to the two guide pins,
   wherein the resilient device includes:
   a block body installed on the frame;
   a pressing piece installed on the block body and configured to press each spacer grid; and
   two springs applying resilient force to the pressing piece, wherein the pressing piece includes a slanted guide face configured to guide each spacer grid into corresponding each of the plurality of holding recesses, and wherein the transparent backplate of the support is an acryl.

* * * * *